United States Patent [19]

Okuno

[11] Patent Number: 5,796,072
[45] Date of Patent: Aug. 18, 1998

[54] ELECTRIC SOLDERING IRON WITH METAL PIPE IN GRIP TO DISSIPATE HEAT

[75] Inventor: Ryuhei Okuno, Osaka, Japan

[73] Assignee: Hozan Tool Industrial Co., Ltd., Osaka, Japan

[21] Appl. No.: 627,098

[22] Filed: Apr. 3, 1996

[30] Foreign Application Priority Data

Apr. 13, 1995 [JP] Japan ............................ 7-087874

[51] Int. Cl.$^6$ ............................................. B23K 3/02
[52] U.S. Cl. ............................................. 219/229; 228/51
[58] Field of Search .................... 219/229–239; 228/51-55

[56] References Cited

U.S. PATENT DOCUMENTS

| | | | |
|---|---|---|---|
| 3,121,781 | 2/1964 | Schoenwald | 219/237 |
| 3,770,183 | 11/1973 | Vanyi | 228/53 |
| 3,770,937 | 11/1973 | Smits | 219/241 |
| 3,786,229 | 1/1974 | Hombrecher | 219/241 |
| 4,734,559 | 3/1988 | Fortune et al. | 219/241 |
| 4,903,884 | 2/1990 | Royston et al. | 228/51 |
| 5,059,769 | 10/1991 | Fortune | 219/238 |
| 5,182,435 | 1/1993 | Wang | 219/230 |
| 5,329,085 | 7/1994 | Cowell et al. | 219/616 |
| 5,406,053 | 4/1995 | Masreliez | 219/241 |
| 5,412,178 | 5/1995 | Tamura | 219/241 |

*Primary Examiner*—John A. Jeffery
*Attorney, Agent, or Firm*—Wenderoth, Lind & Ponack

[57] ABSTRACT

An electric soldering iron is made difficult to heat up at the front end of its grip. A metal pipe is inserted in the grip so that the pipe comes into close contact at least partially with the grip, with a gap formed between the outer peripheral surface of the pipe at its front end and the inner peripheral surface of the grip. The heat produced by the accumulator conducts through the pipe to the grip and disperses throughout the grip. Thus, the front end of the grip is less likely to heat up.

4 Claims, 1 Drawing Sheet

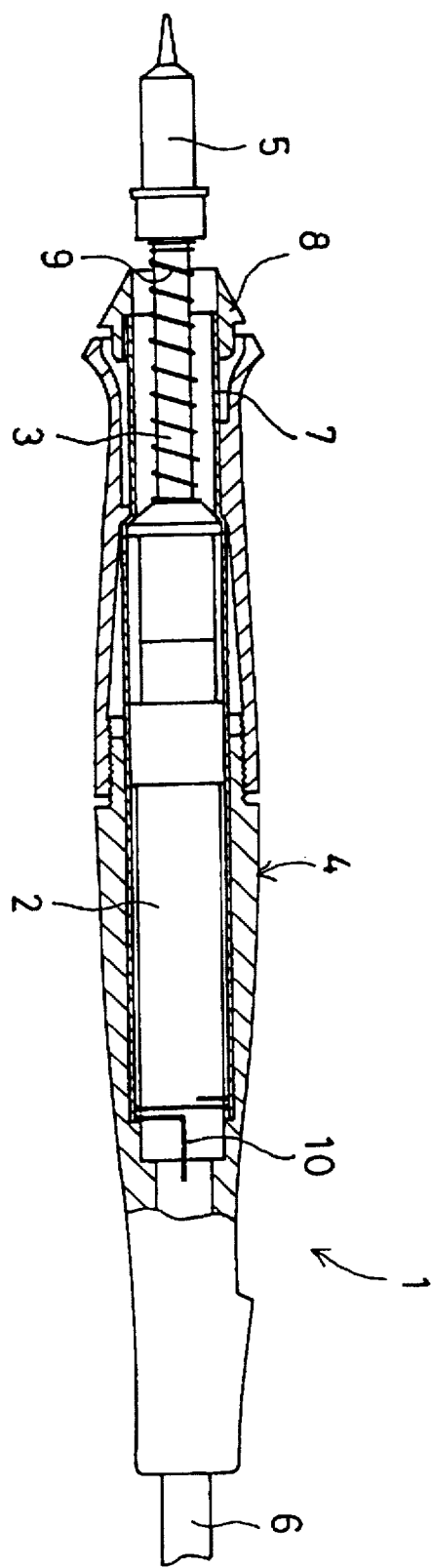

ELECTRIC SOLDERING IRON WITH METAL PIPE IN GRIP TO DISSIPATE HEAT

BACKGROUND OF THE INVENTION

This invention relates to an electric soldering iron which is less likely to heat up at the front end of its grip.

For delicate, precise soldering work with a soldering iron, an operator should hold its grip at a portion as near to its front end as possible.

During soldering, conventional soldering irons tend to heat up at the front end of the grip because this portion is located close to the heat accumulator, though an air gap as a heat insulating layer is present between the front end of the grip and the accumulator. Since the front end of the grip tends to heat up during soldering, it was painful for the operator to hold this portion.

SUMMARY OF THE INVENTION

An object of this invention is to provide an electric soldering iron which is difficult to heat up at the front end of its grip.

According to this invention, there is provided an electric soldering iron comprising a rod-shaped heater. A heat accumulator is provided at one end of the heater. A grip is mounted so as to surround the heater while keeping some space from the heater, so that the heat accumulator protrudes from the grip. A metal pipe is mounted in the grip around the heater so as to be at least partially in contact with the grip, with a gap formed between the outer peripheral surface of the pipe at its front end and the inner peripheral surface of the grip.

With this arrangement, the heat produced by the accumulator is conducted through the pipe to the grip and dispersed throughout the grip. Also, the gap formed between the outer periphery of the pipe and the inner periphery of the grip at the front end of the pipe prevents the front end of the grip from being heated directly by the pipe. Thus, the front end of the grip is less likely to heat up.

BRIEF DESCRIPTION OF THE DRAWINGS

Other features and objects of the present invention will become apparent from the following description made with reference to the accompanying drawing, which is a partially cutaway sectional view of an embodiment of an electric soldering iron according to this invention.

DETAILED DESCRIPTION OF THE PREFERRED EMBODIMENT

As shown in the drawings, an electric soldering iron 1 of the embodiment comprises a rod-shaped ceramic heater 3 having its rear end supported by a heater holder 2 and mounted in a cylindrical grip 4 with some space present between the inner surface of the grip 4 and the heater 3.

The grip 4 is separable at its central portion into a front grip and a rear grip. The front grip and the rear grip have female and male threads at their rear and front ends, respectively. By engaging the female and male threads, the front and rear grips are coupled together.

The heater 3 has its front end protruding from the front end of the grip 4 and carries a heat accumulator 5 at the protruding end.

The heat accumulator 5 is made of a special copper alloy and has a pointed tip.

The heater holder 2 is connected at its rear end to a power cable 6. Electricity is supplied to the heater 3 through the cable 6.

A metal pipe 7 is inserted in the grip 4 to surround the heater 3 and the heater holder 2, while keeping some space from the heater 3.

At the rear end of the metal pipe 7, its outer periphery is kept in close contact with the inner periphery of the grip 4. Near the front end of the pipe, a gap is formed between the outer periphery of the pipe 7 and the inner periphery of the grip 4.

The pipe 7 has its front end protruding slightly from the front end of the grip 4. A heat cover 8 is fixed to the protruding end of the pipe 7.

A conductive ground spring 9 is wound around the heater 3 between the heat accumulator 5 and the heat holder 2.

The ground spring 9 electrically connects the heat accumulator 5 to a grounded portion of the heater holder 2, thereby grounding the accumulator 5.

Another conductive ground spring 10 is connected to the rear end of the heater holder 2. Since it abuts the inner periphery of the pipe 7, this earth spring 10 electrically connects the pipe 7 to the grounded portion of the heater holder 2, thereby grounding the pipe 7.

With this soldering iron 1, the heat produced by the heat accumulator 5 during soldering is conducted through the metal pipe 7 to the rear end of the grip 4 and dispersed throughout the entire grip 4. Thus, it is possible to prevent local overheating of the grip 4 at its front end as in conventional soldering irons.

Also, the gap formed between the outer periphery of the pipe and the inner periphery of the grip 4 at the front end of the pipe 7 prevents the front end of the grip 4 from being heated directly by the pipe 7.

Such an electric soldering iron 1 is difficult to heat up at the front end of the grip 4. Thus, an operator can perform soldering work without pain while, holding the grip 4 at its front end.

If the pipe 7 is made of a material having a high thermal conductivity such as copper, silver or gold, the grip tends to heat up excessively at its contact portion with the pipe. If it is made of a material having a low thermal conductivity such as iron or stainless steel, the grip tends to heat up excessively at its front end because no sufficient heat conduction is possible. Thus, the pipe should be made of brass or aluminum.

A resin is preferable as the material for the grip 4.

With the electric soldering iron according to this invention, fine soldering work is possible, holding the front end of the grip because this portion is less likely to heat up during soldering.

What is claimed is:

1. An electric soldering iron comprising:

a rod-shaped heater having a front end and a rear end;

a heat accumulator provided at said front end of said rod-shaped heater;

a grip surrounding said heater such that said heat accumulator protrudes from said grip, said grip having a tip portion and an inner periphery;

a heat dissipating metal pipe mounted in said grip so as to surround said rod-shaped heater and so as to be in partial contact with said inner periphery of said grip and out of contact with said grip at said tip portion thereof; and a heater holder mounted in said metal pipe and supporting the rear end of said rod-shaped heater;

wherein said pipe extends substantially the entire length of said grip, and wherein said pipe and said rod-shaped heater are not in contact with each other.

2. The electric soldering iron of claim 1, wherein said metal pipe is made of a metal selected from the group consisting of brass and aluminum.

3. The electric soldering iron of claim 1, wherein a heat cover is mounted on a front end of said metal pipe so as to be spaced from the inner periphery of said grip.

4. The electric soldering iron of claim 1, wherein said rod-shaped heater is a ceramic heater.

* * * * *